United States Patent [19]

Hagen

[11] Patent Number: 4,836,692

[45] Date of Patent: Jun. 6, 1989

[54] SHAFT SUPPORT COMPRISING STATIC FLUID BEARINGS

[75] Inventor: Johannes L. M. Hagen, Eindhoven, Netherlands

[73] Assignee: U.S. Philips Corporation, New York, N.Y.

[21] Appl. No.: 282,847

[22] Filed: Dec. 9, 1988

Related U.S. Application Data

[63] Continuation of Ser. No. 125,028, Nov. 24, 1987, abandoned.

[30] Foreign Application Priority Data

Nov. 24, 1986 [NL] Netherlands ........................ 8602973

[51] Int. Cl.⁴ .............................................. F16C 32/06

[52] U.S. Cl. .................................... 384/107; 384/111

[58] Field of Search ................. 384/99, 100, 107, 111, 384/113–118, 121, 192, 247, 261, 274, 322, 368, 397–399

[56] References Cited

U.S. PATENT DOCUMENTS

| | | | |
|---|---|---|---|
| 2,756,115 | 7/1956 | Michel | 384/107 |
| 3,385,009 | 5/1968 | Lueders | 384/100 X |
| 3,493,273 | 2/1970 | Greenberg | 384/111 |
| 3,698,774 | 10/1972 | Saulgeot et al. | 384/107 |

FOREIGN PATENT DOCUMENTS

| | | | |
|---|---|---|---|
| 1145178 | 3/1985 | U.S.S.R. | 384/100 |

*Primary Examiner*—Thomas R. Hannon

*Attorney, Agent, or Firm*—Brian J. Wieghaus

[57] ABSTRACT

A shaft support comprising a shaft supported by a radial and an axial static fluid bearing, which shaft is rotatably arranged in a bearing sleeve and is provided with a flange-shaped compensation member, of which a part is situated in a compensation space. The compensation space is connected to a pressure source so that a radially acting resulting force is exerted on the compensation member and the shaft. The shaft support is particularly suitable for use with comparatively accurate bearings having a comparatively high bearing capacity.

12 Claims, 4 Drawing Sheets

29
3
19
59
57
11
9
61
1
15
55
65
63
71
67
73
81
41,43
33
53
79
IV
31
47,49
37
75
69
77
87
89
41,45,51
97

SHAFT SUPPORT COMPRISING STATIC FLUID BEARINGS

This is a continuation of application Ser. No. 125,028 filed Nov. 24, 1987, now abandoned.

BACKGROUND OF THE INVENTION

The invention relates to a shaft support comprising a radial static fluid bearing provided with a bearing sleeve and an axial static fluid bearing as well as a shaft rotatably arranged in the bearing sleeve.

In a shaft support of the kind mentioned in the opening paragraph and known from U.S. Pat. No. 3,493,273, the axial fluid bearing has axially directed fluid supplies merging at a flange on the shaft. An oblique positioning of the shaft in a bearing sleeve with a unilateral load on the shaft is avoided by an increase of pressure in the radial fluid space between a wall of a disk-shaped chamber and the disk-shaped flange situated in this chamber. The radial bearing capacity of the shaft support is solely supplied by the radial fluid bearing. Due to the small gap width of the axial fluid bearing, the torque of the axial fluid bearing, which can counteract an oblique positioning of the shaft, is comparatively limited. Further, the radial bearing capacity of the radial fluid bearing is determinative of the total or the maximum radial bearing capacity of the shaft support.

SUMMARY OF THE INVENTION

The invention has for its object to provide a shaft support of the kind with which a comparatively large local bearing capacity can be obtained at any desired area viewed in the longitudinal direction of the shaft. The term "local radial bearing capacity" is to be understood to mean an additional radial bearing capacity which in a plane at right angles to the shaft is present only over part of a circumference of a circle.

The shaft support according to the invention is for this purpose characterized in that the support is provided with first and second sections of an annular fluid space between a flange-shaped compensation member located on the shaft and a wall of an annular chamber in which the compensation member is arranged. These sections are mutually separated by first restrictions located substantially diametrically opposite to each other, while a compensation space or recess located in one of the sections and extending in the circumferential direction of the compensation member is connected to a pressure source, which exerts a radially acting resulting force on the circumferential surface of the flange-shaped compensation member. This radial force is substantially equal to the product of the pressure supplied by the pressure source and the surface area of the compensation member when projected in the direction of the radial force.

A particular embodiment of a shaft support according to the invention, in which the axial static fluid bearing is integrated with the compensation member, is further characterized in that the axial fluid bearing has axially directed fluid supplies merging at opposing thrust surfaces of flange shaped compensation member. The compensation space being separated from the fluid supply by second restrictions and a transitional region in which the prevailing pressure is higher than the pressure prevailing in the compensation space and lower than the pressure prevailing in the fluid supply.

A further embodiment of a shaft support according to the invention, which is suitable for cases of asymmetrical load on the shaft, is characterized in that the shaft is provided with the compensation member at one of its two ends.

BRIEF DESCRIPTION OF THE DRAWING

The invention will be described more fully with reference to the drawings, in which.

DESCRIPTION OF THE PREFERRED EMBODIMENT

Figure 1:
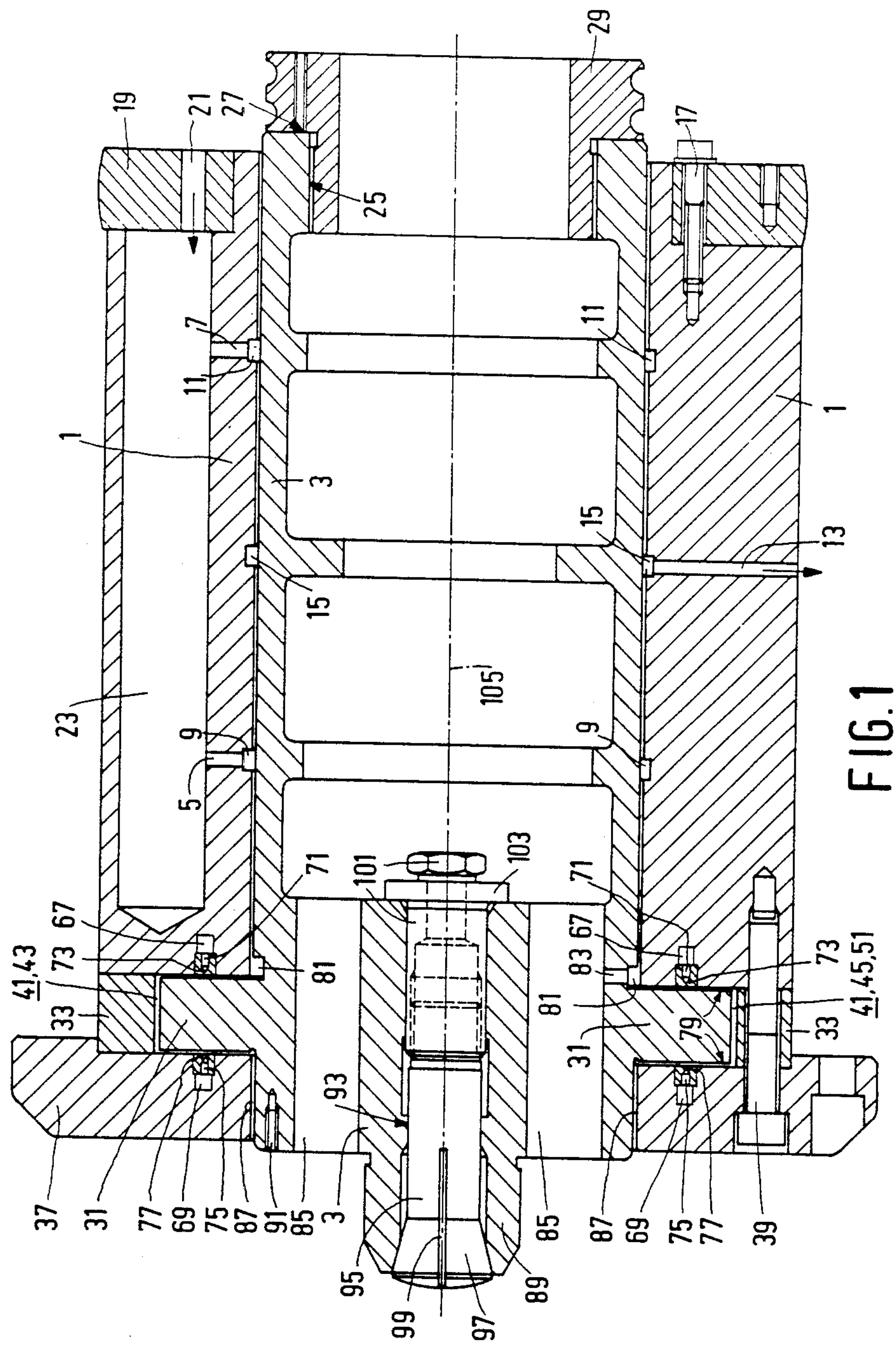
FIG. 1 is a longitudinal sectional view of a shaft support according to the invention.

The shaft support illustrated in FIGS. 1 through 4 comprises a fixed metal bearing sleeve 1, in which a hollow shaft 3 is rotatably journalled. The shaft 3 is journalled in a radial direction by means of a radially acting static fluid bearing having two fluid supplies 5 and 7, which are connected to annular ducts 9 and 11 in the bearing sleeve 1, and a fluid drain 13 which is connected to an annular duct 15 in the bearing sleeve 1.

The term "static fluid bearing" is to be understood to mean both a bearing operating with gas and a bearing operating with liquid, the gas or the liquid being supplied from a pressure source. In the following description static bearings which operate with compressed air will be described throughout.

A ring 19 is screwed on to the bearing sleeve 1 (cf. FIG. 1) by means of bolts 17, which ring 19 is provided with an entrance duct 21 for compressed air, which is connected through a connection duct 23 to the fluid supplies 5 and 7. A belt pulley 29 for driving the shaft 3 is secured to the righthand end of the shaft 3 by means of screw connections 25 and 27. The shaft 3 has a flange 31 in the form of a part of a circular disk which is partly integrated in the shaft and is made in one piece with this shaft. The flange 31 acts as a compensation member 31, which will be explained more fully hereinafter.

A metal ring 33 is secured to the lefthand end of the bearing sleeve 1 by means of bolts 35 (cf. FIG. 4), while a further metal ring 37 (cf. FIG. 1) is secured to this end by means of bolts 39 passed through a metal ring 33. The rings 33 and 37 together with the lefthand end surface of the bearing sleeve 1 define an annular chamber, in which the flange-shaped compensation member 31 is arranged. An annular fluid space or recess 41 comprising a first section 43 and a second section 45 is situated between a wall of the said annular chamber constituted by the inner side of the ring 33 and the flange-shaped compensation member 31. The sections 43 and 45 are mutually separated by two first restrictions 47 and 49, which are constituted by ridges on the inner side of the ring 33. The ridge-shaped restrictions 47 and 49 are located (substantially) diametrically opposite to each other and extend throughout the width of the ring 33 (cf. also the dotted line 47, 49 in FIG. 3). In operation, a gap of about 10 μm extends radially between the compensation member 31 and the ring 33 at the location of the restrictions 47 and 49. The section 45 forms the so-called compensation space 51, which is connected to a fluid supply 53 (cf. FIG. 3). The fluid supply 53 is connected through a connection duct 55 and an entrance duct 57 to a pressure source not shown in the drawing.

The shaft support further has an axially acting static fluid bearing, which is combined with the compensation member 31. The bearing sleeve 1 is provided with an entrance duct 59, which is connected via a connection duct 61 and ducts 63 and 65 to two annular ducts 67 and 69, respectively. The duct 67 is formed in the bearing sleeve 1 and the duct 69 is formed in the ring 37. Axially directed fluid supplies 71 regularly spaced on a circle on the bearing sleeve 1 are connected to the annular duct 67 and these fluid supplies merge via (second) restrictions 73 into the axial gap between the thrust surfaces of the compensation member 31 and the complementary bearing surface of the bearing sleeve 1. Axially directed fluid supplies 75 regularly spaced on a circle on the ring 37 are connected to the annular duct 69 and these fluid supplies merge via (second) restrictions 77 into the axial gap between the compensation member 31 and the ring 37. The compensation space 51 is separated from the fluid supplies 71 and 75 by the (second) restrictions 73, 77 and transitional regions 79 situtaed in the axial gaps between the compensation member 31 and the bearing sleeve 1 and the ring 37, respectively.

During operation, a pressure higher than the pressure in the compensation space 51 and lower than the pressure in the fluid supplies 71 and 75 prevails in the transitional regions 79. The axial gap between the compensation member 31 and the bearing sleeve 1 communicates with an annular duct 81, which is connected by means of a radial bore 83 to one of a number of axial bores 85 in the shaft 3, in which the ambient pressure prevails. The axial gap between the compensation member 31 and the ring 37 communicates with an annular radial gap 87 between the compensation member 31 and the ring 37. The ambient pressure prevails in the radial gap 87. The section 43 is connected via a radial bore (not shown) in the ring 33 to the atmosphere.

At its lefhand end the shaft 3 has a hub 89, on which, for example, an annular or disk-shaped work-piece can be secured. For this purpose, the shaft 3 is provided with screw holes 91 so that a workpiece can be screwed by means of bolts against the shaft 3. Further, the shaft 3 has an axial bore 93, into which a draw bolt 95 can be passed, which has a conical head 97, which is provided with a slot 99. The draw bolt 95 is provided with an axial bore 96 (cf. FIG. 2), in which a work-piece can be secured. The draw bolt 95 is screwed into a nut sleeve 101, which engages in the bore 93 and bears on the shaft 3 by means of a shoulder 103. By rotation of the nut sleeve 101, a work-piece can be secured by clamping in the draw bolt 95. Consequently, in the two ways described, work-pieces can be secured to the shaft 3.

Figure 4:
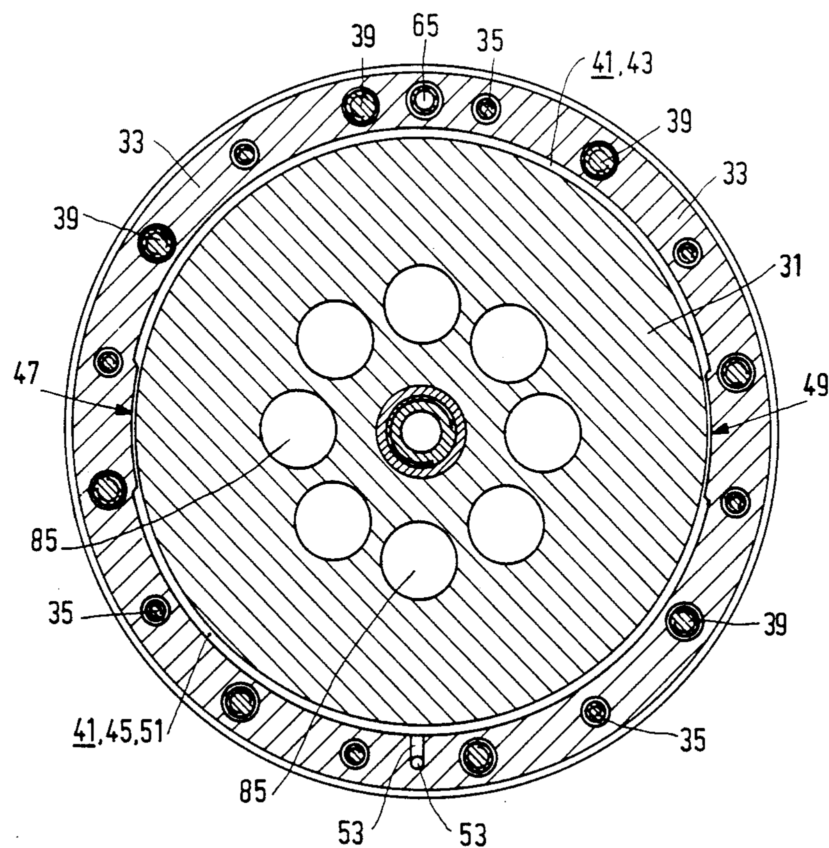
FIG. 4 is a sectional view of the shaft support taken on the line IV—IV in FIG. 3.

With an arrangement of the shaft support with horizontal center line 105, a vertical force is exerted on the hub 89, this force lying in FIG. 1 in the plane of the paper and being transverse to a diametrical connection line between the restrictions 47 and 49 (cf. FIG. 4). The drive of the pulley 29 is preferably arranged so that the resulting force exerted by a belt on the pulley is parallel to the force exerted on the hub 89 by weight of the work-piece.

If, as is the case with a shaft support according to U.S. Pat. No. 3,493,273, no compensation space 51 is present, the radial and axial reaction forces are supplied by the radial and the axial fluid bearings. The axial fluid bearings in particular supply a comparatively large reaction torque. Since the shaft support according to the invention is provided with the compensation space 51, in which the compensation member 31 is situated, the permissible radial load of the shaft 3 is considerably increased. The compensation member 31 supplies not only an additional radial reaction force, but also a torque which prevents oblique positioning of the shaft 3. The additional radial (vertical) reaction force is substantially equal to the product of the pressure in the compensation space supplied by the pressure source connected to the compensation space 51 and the projected surface area of the compensation member 31.

Due to the fact that the compensation member 31 is situated at the lefthand end of the shaft at a comparatively small distance from the hub 89, the difference between the distance from the effective pivot point of the shaft 3 to the point at which the load (weight of the work-piece) is applied to the shaft and that to the point at which the reaction force of the compensation member 31 is applied to the shaft 3 is comparatively small. Moreover, this difference can be compensated for by increase of the pressure in the compensation space 51. For this purpose, a pressure regulator can be arranged in the connection between the pressure source and the compensation space 51. Such a pressure regulator can even be controlled by means of a sensor signal which is proportional to the pressure variation in the compensation space 51 caused by load variations. Instead of a passive system, an active feedback system is then obtained.

Figure 2:
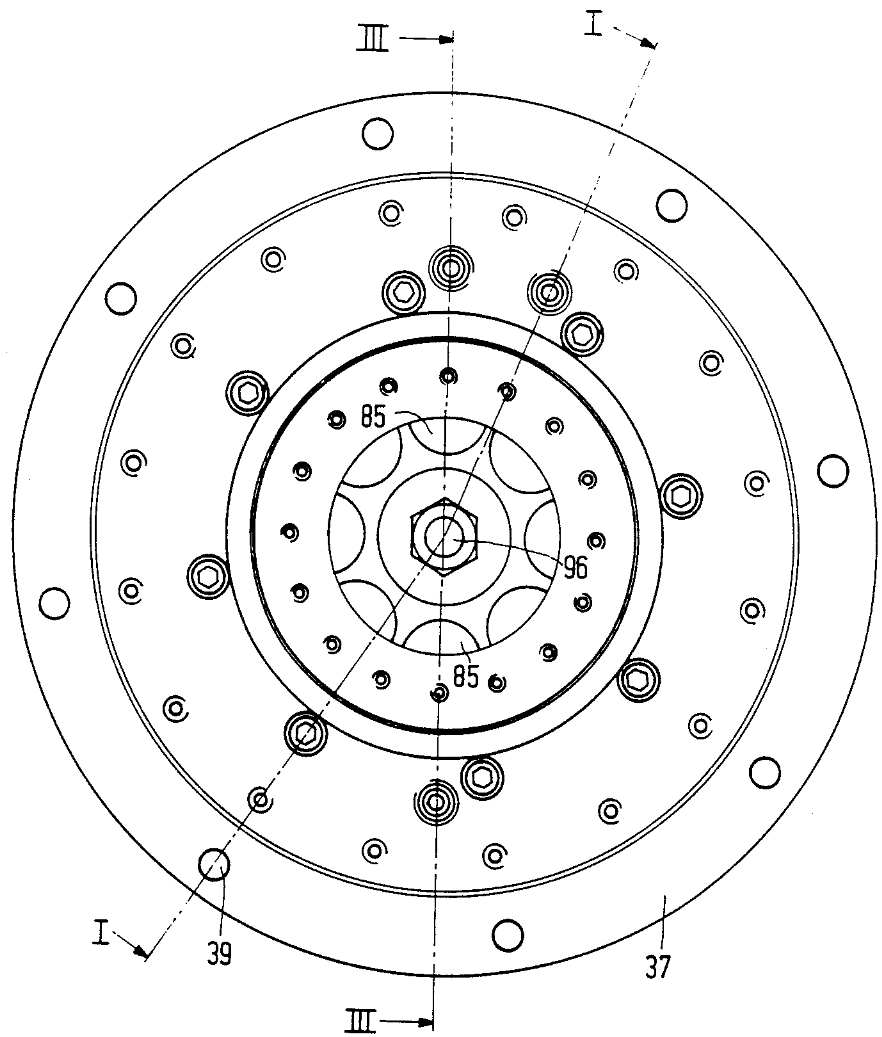
FIG. 2 is a side view of the shaft support shown in FIG. 1.
Figure 3:
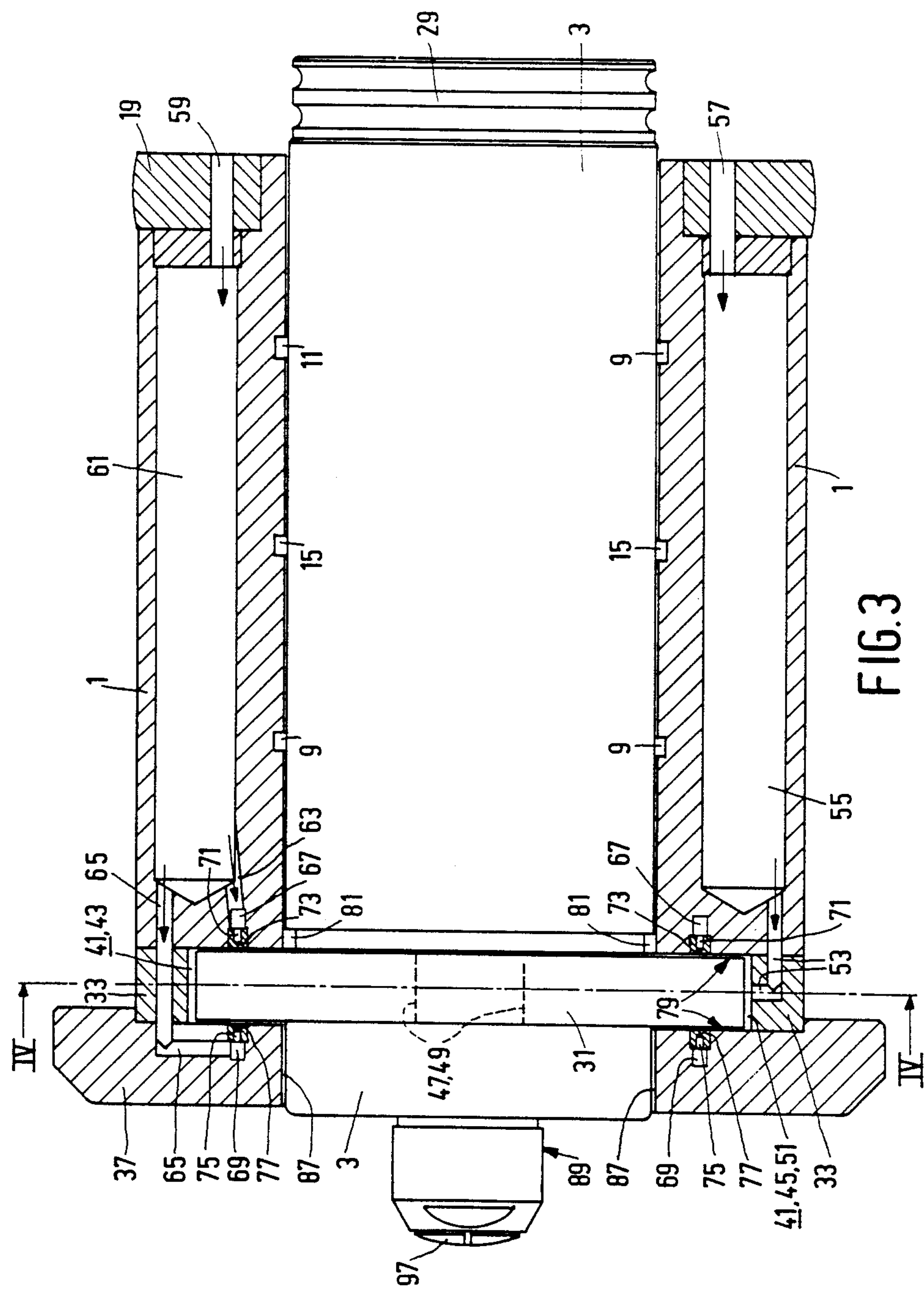
FIG. 3 is a sectional view of the shaft support taken on the line III—III in FIG. 2.

The pressures in the fluid supplies 67, 69 and the compensation space 51 and the size of the (second) restrictions 73, 77 are chosen so that a pressure higher than the pressure in the compensation space 51 and of course lower than the pressure in the fluid supplies prevails in the transitional regions 79 (cf. FIGS. 1 and 2). Thus, leakage from the compensation space 51 to the atmosphere is avoided as far as possible. The (first) restrictions 47, 49 have a size (gap about 10 μm) such that an acceptable leakage to the atmosphere takes place via the section 43. In the present case, a circumferential gap having a size of about 300 μm is located between the compensation member 31 and the ring 33. This means that an oblique positioning of the shaft 3 is not compensated for by the known build-up of pressure in a narrowing gap because it is too large for the purpose. Compensation is obtained by the compensation member 31 and the axial fluid bearing combined with it.

The shaft 3 may be provided with a plurality of compensation members 31, each of which may be combined with an axial fluid bearing. The axial fluid bearing may be separated from the compensation member. With a vertically arranged shaft support, for example, use may be made of a disk which is situated at the end of the shaft in a separate axially acting pressure chamber. It should be noted that the resulting radially directed compensation force on the compensation member in the horizontal orientation shown in the figures (the horizontal components of the pressure forces on the compensation member cancel each other, while the sum of the vertical components supplies the resulting compensation force) need not necessarily be parallel and oppositely directed to the forces loading the shaft 3. However, it is preferable to choose the arrangement of the shaft support so that the component of the resulting compensation force which is parallel and oppositely directed to the load forces is as large as possible. The shaft support may be of multiple construction having a number compensation members 31 arranged at different areas along the shaft 3. Instead of a flange-shaped compensation member integrated in the shaft 3, rings may be used, which are detachably secured on the shaft 3.

What is claimed is:

1. A bearing system, comprising:

a housing;

a shaft rotatably disposed within said housing;

a first radial bearing for radially centering and supporting said shaft in said housing;

a static thrust bearing comprising said shaft having a flange with opposing thrust surfaces, said housing having a pair of walls with bearing surfaces complimenting said flange thrust surfaces, and means comprising a plurality of fluid restrictors circumferentially arranged in said pair of housing walls for introducing a fluid at a first pressure between each thrust surface and the complimenting bearing surface; and a second radial bearing for producing a radial force on said flange for counteracting radial forces applied to said shaft during bearing operation, said second radial bearing being a static bearing and comprising said annular flange having a circumferential surface, said housing having a circumferential wall defining a recess opposite said circumferential flange surface, and means for supplying a fluid to said recess at a second pressure lower than said first pressure for exerting a radial force on said flange, said radial force being substantially equal to the product of said second pressure and the surface area of said circumferential flange surface when projected in the direction of the radial force, said fluid restrictors being radially spaced from said circumferential flange surface such that the region between each thrust surface and the complimenting bearing surface bounded by said restrictors and said recess has a pressure higher than the second pressure and lower than the first pressure during bearing operation.

2. A bearing system as claimed in claim 1, wherein said flange thrust surfaces and said bearing surfaces are planar and perpendicular to the shaft axis, and said circumferential flange surface defines a circular plane curve concentric with said shaft.

3. A bearing system as claimed in claim 1, wherein said first radial bearing is a static bearing comprising a bearing sleeve complimenting said shaft and means for supplying fluid under pressure between said sleeve and said shaft.

4. A bearing system as claimed in claim 3, wherein said fluid is a gas.

5. A bearing system as claimed in claim 1, wherein said fluid is a gas.

6. A bearing system as claimed in claim 1, wherein said shaft has an end adapted for holding a work piece and said flange is near said end.

7. A bearing system as claimed in claim 1, wherein the circumferential extent of said recess is defined by ridges on said circumferential housing wall which define a radial gap between said ridges and said circumferential flange surface substantially equal to 10 $\mu$m.

8. A bearing system as claimed in claim 7, wherein the depth of said recess is substantially equal to 300 $\mu$m.

9. A bearing system as claimed in claim 1, wherein said recess has a circumferential extent of substantially 180 degrees.

10. A bearing system as claimed in claim 1, wherein said circumferential wall of said housing defines an additional recess diametrically opposite said recess of said second radial bearing and said housing has means comprising a conduit for allowing communication between said additional recess and the exterior of said housing such that the ambient pressure is maintained in said additional recess during bearing operation.

11. A bearing system as claimed in claim 1, wherein said flange comprises an annular ring detachably secured to said shaft.

12. A bearing system as claimed in claim 1, wherein said means for supplying a fluid to said recess further comprises means for sensing the pressure in the recess and means connected to said sensing means for regulating the pressure in said recess.

* * * * *